Jan. 21, 1936.  P. BLANCHET ET AL  2,028,494
MACHINE FOR MAKING FINISHING WELTS
Filed Dec. 14, 1934    10 Sheets-Sheet 1
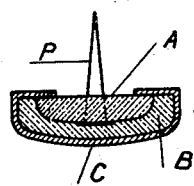
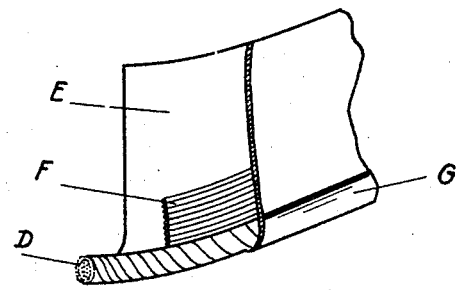
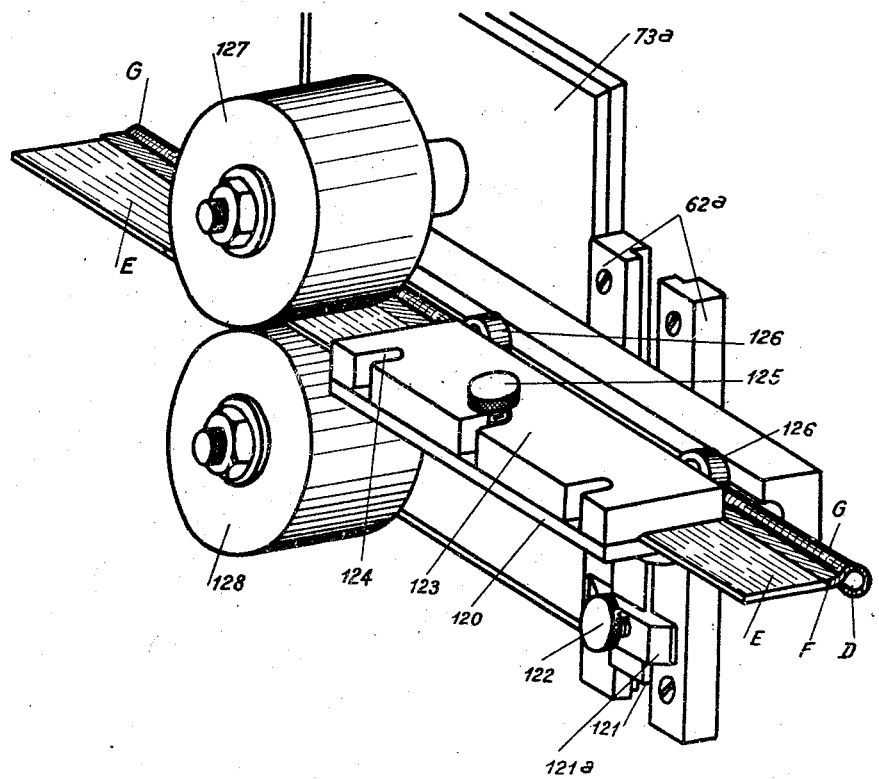
INVENTORS
PAUL BLANCHET
GASTON TILLIE
BY
ATTY.

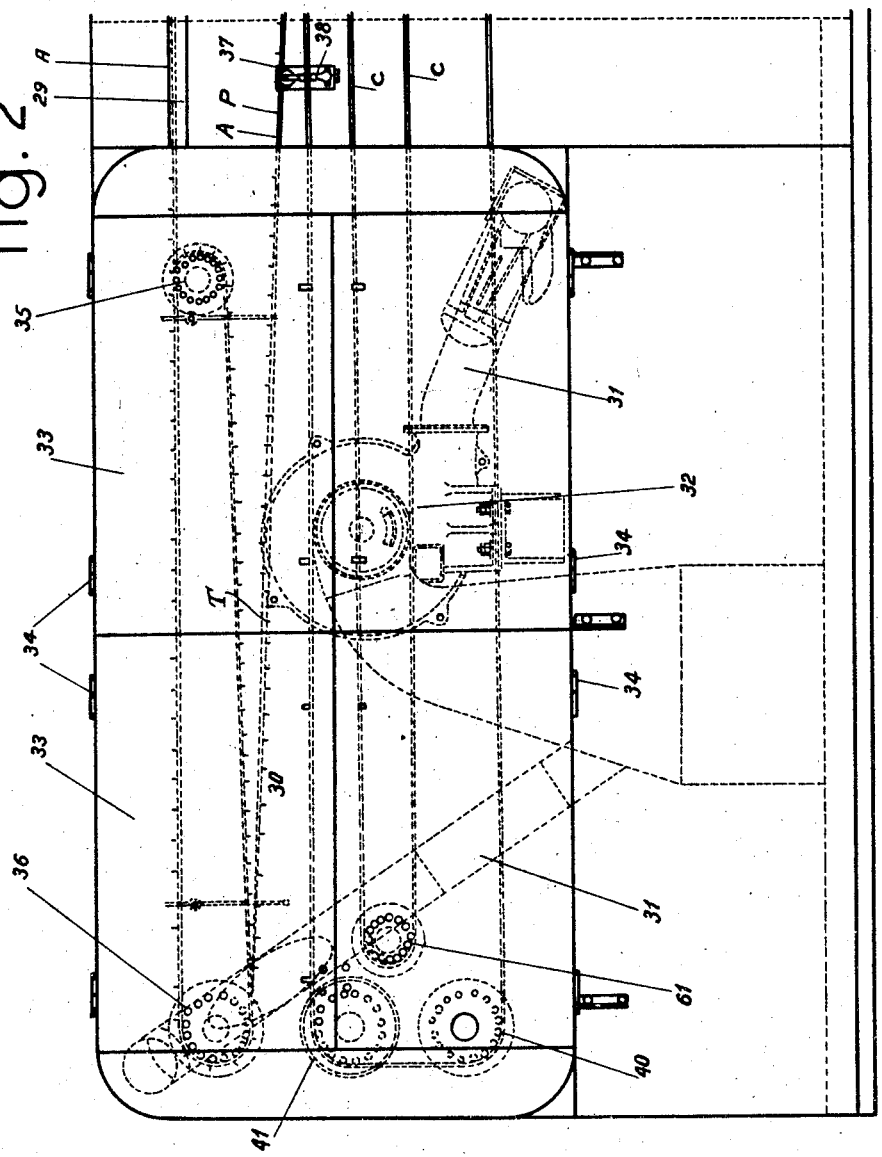

Jan. 21, 1936.   P. BLANCHET ET AL   2,028,494
MACHINE FOR MAKING FINISHING WELTS
Filed Dec. 14, 1934   10 Sheets-Sheet 3
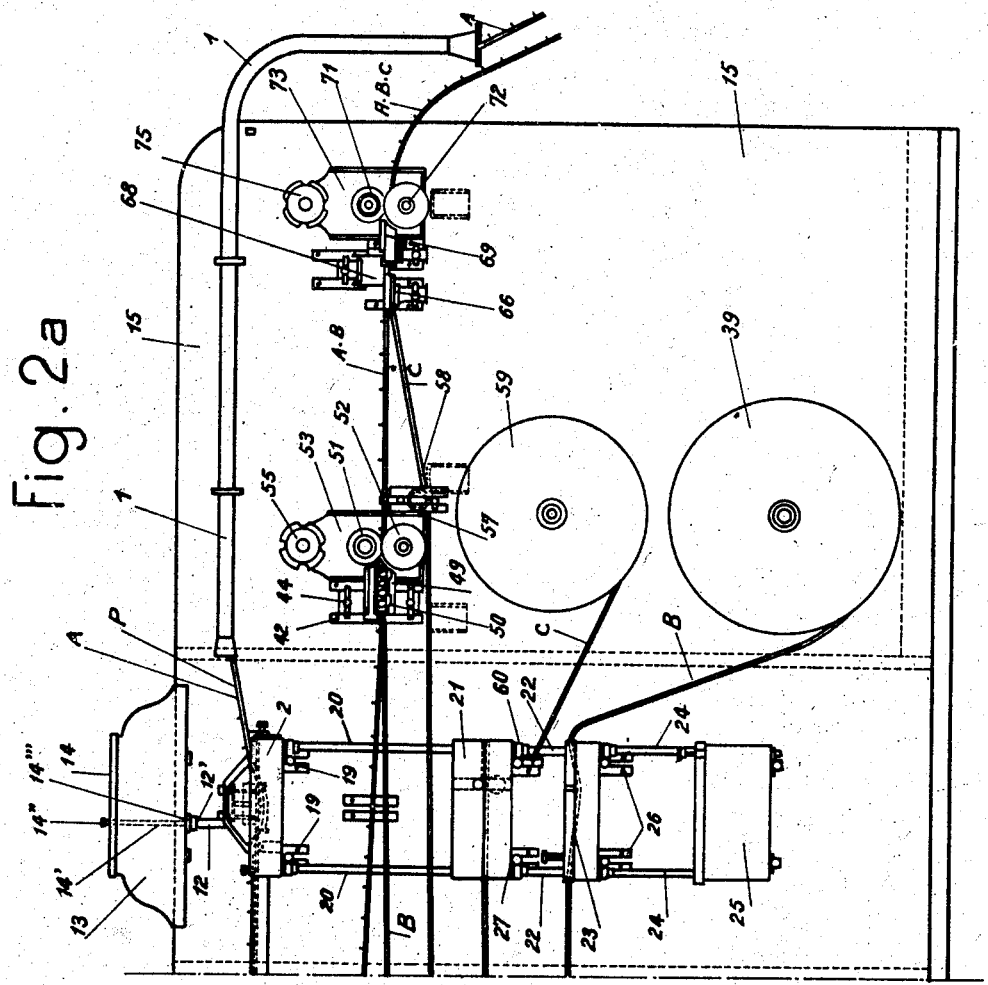
INVENTORS
PAUL BLANCHET
GASTON TILLIE
BY
ATTY.

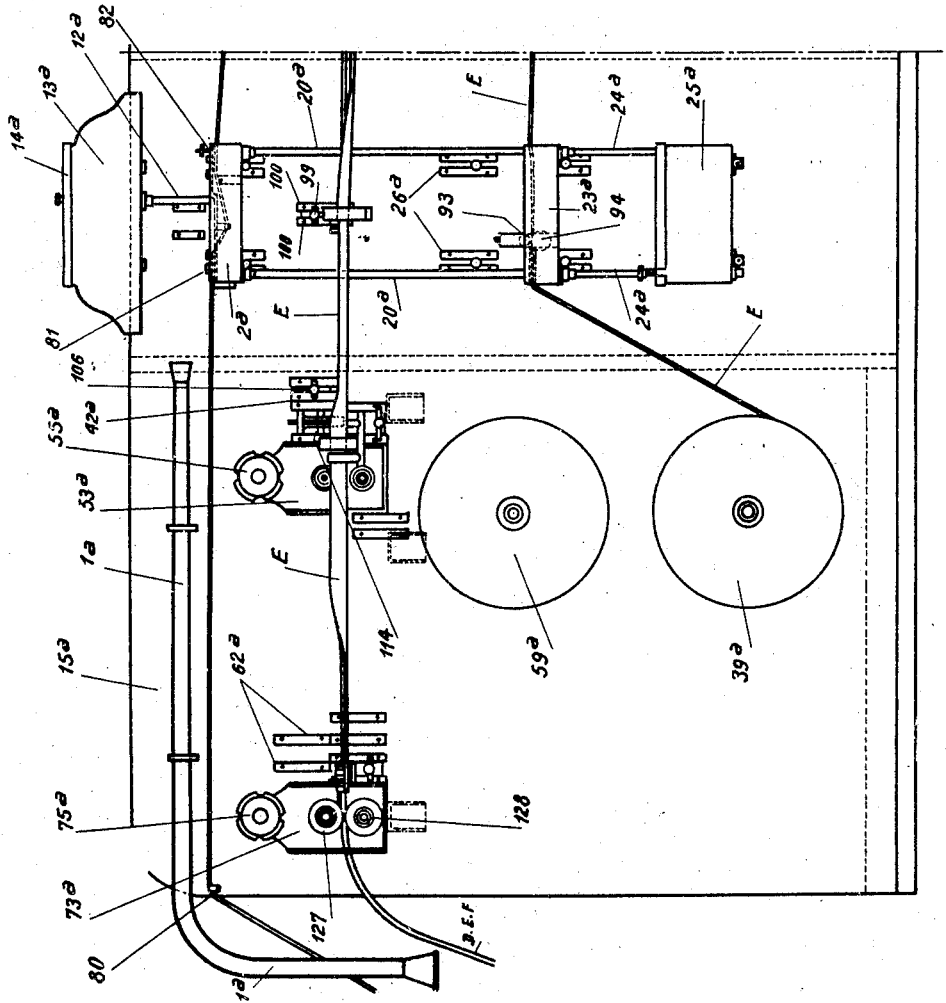

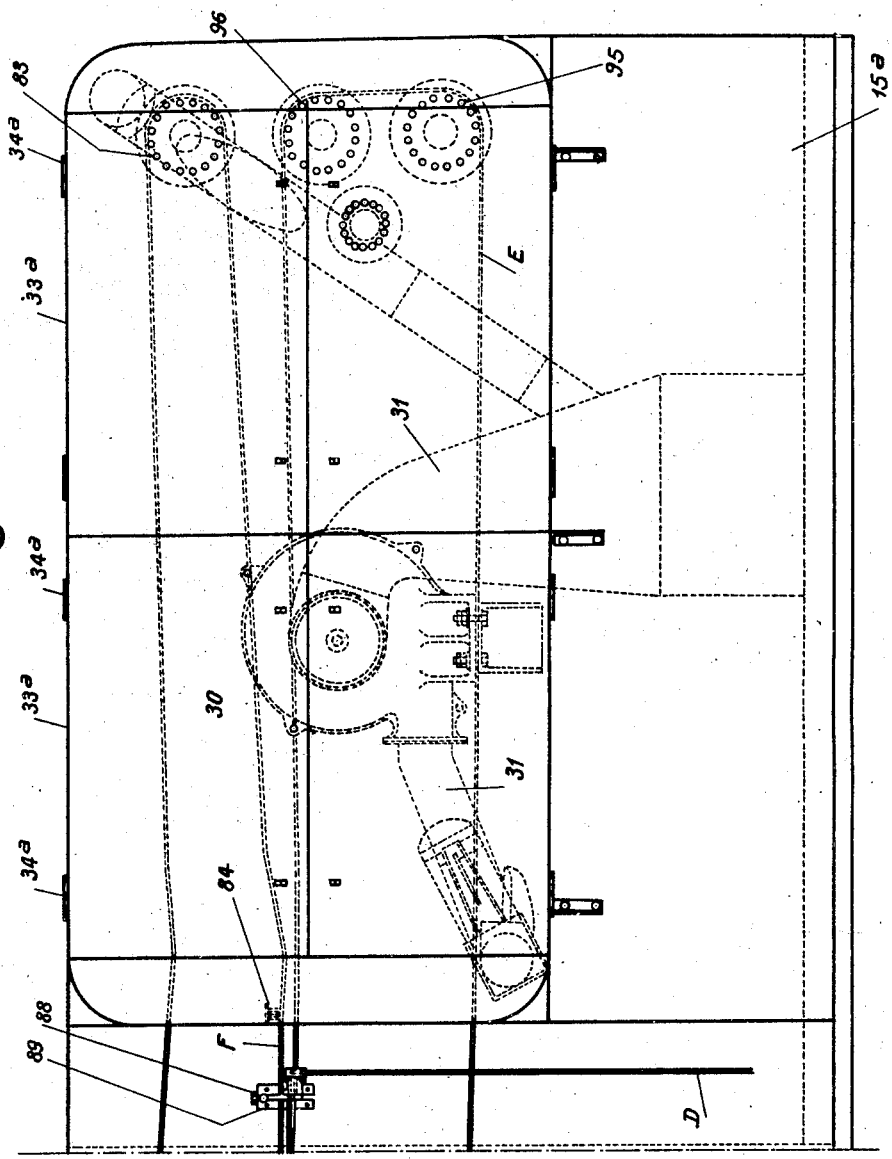

Jan. 21, 1936.  P. BLANCHET ET AL  2,028,494
MACHINE FOR MAKING FINISHING WELTS
Filed Dec. 14, 1934  10 Sheets-Sheet 7

INVENTORS
PAUL BLANCHET
GASTON TILLIE
BY
ATTY.

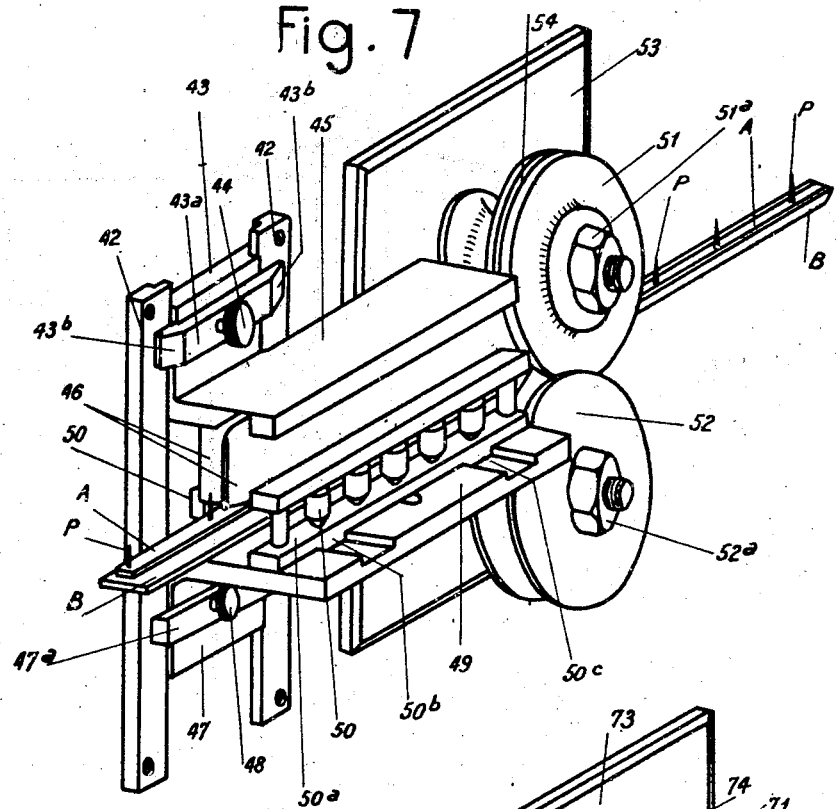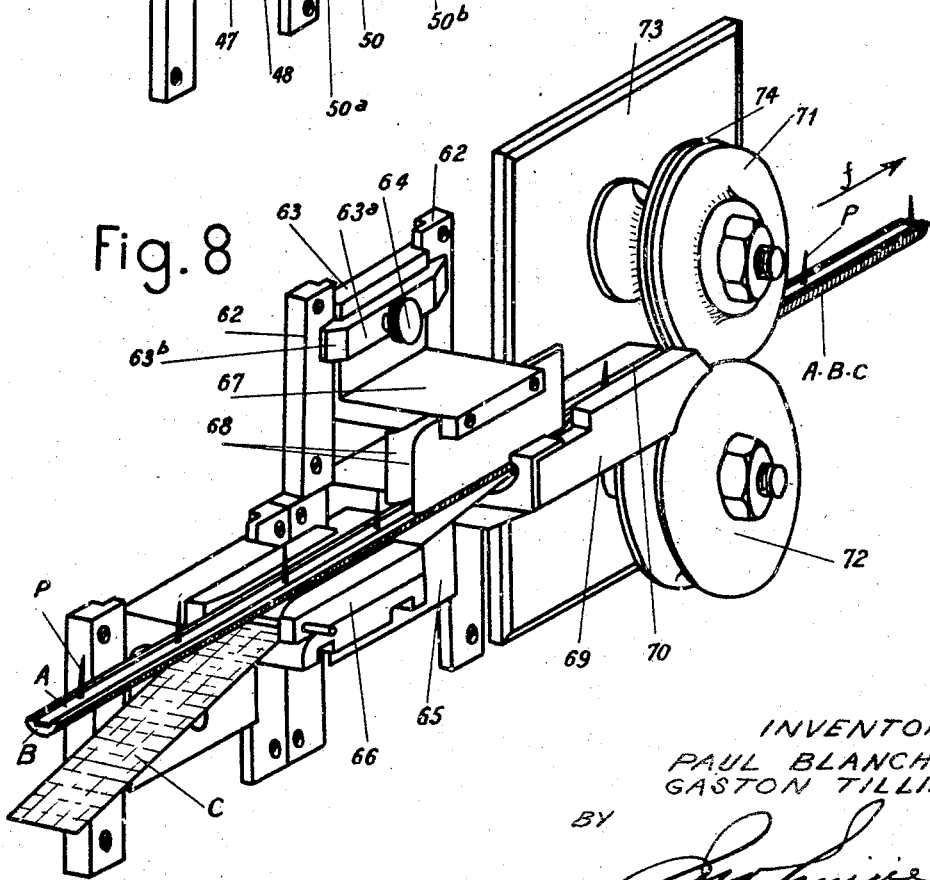

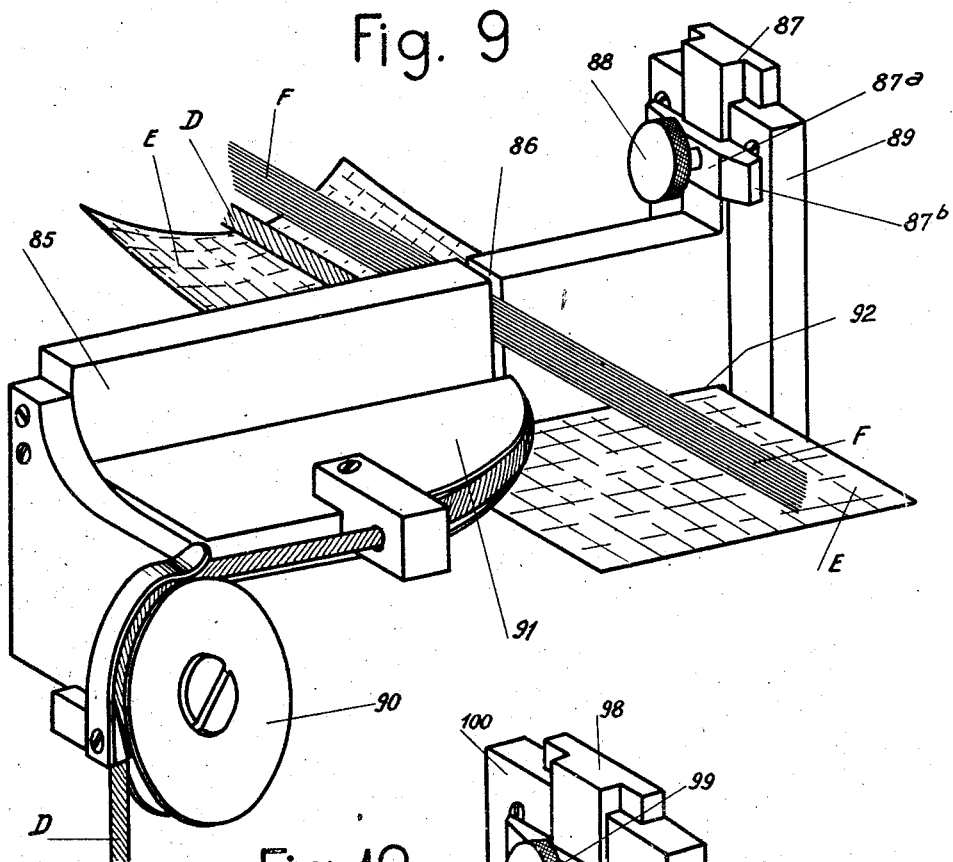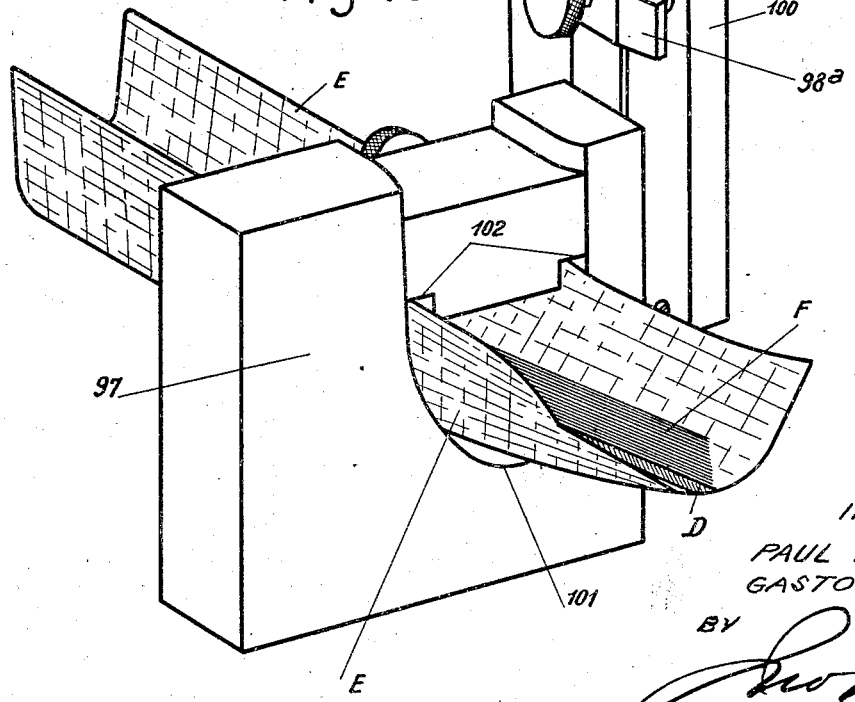

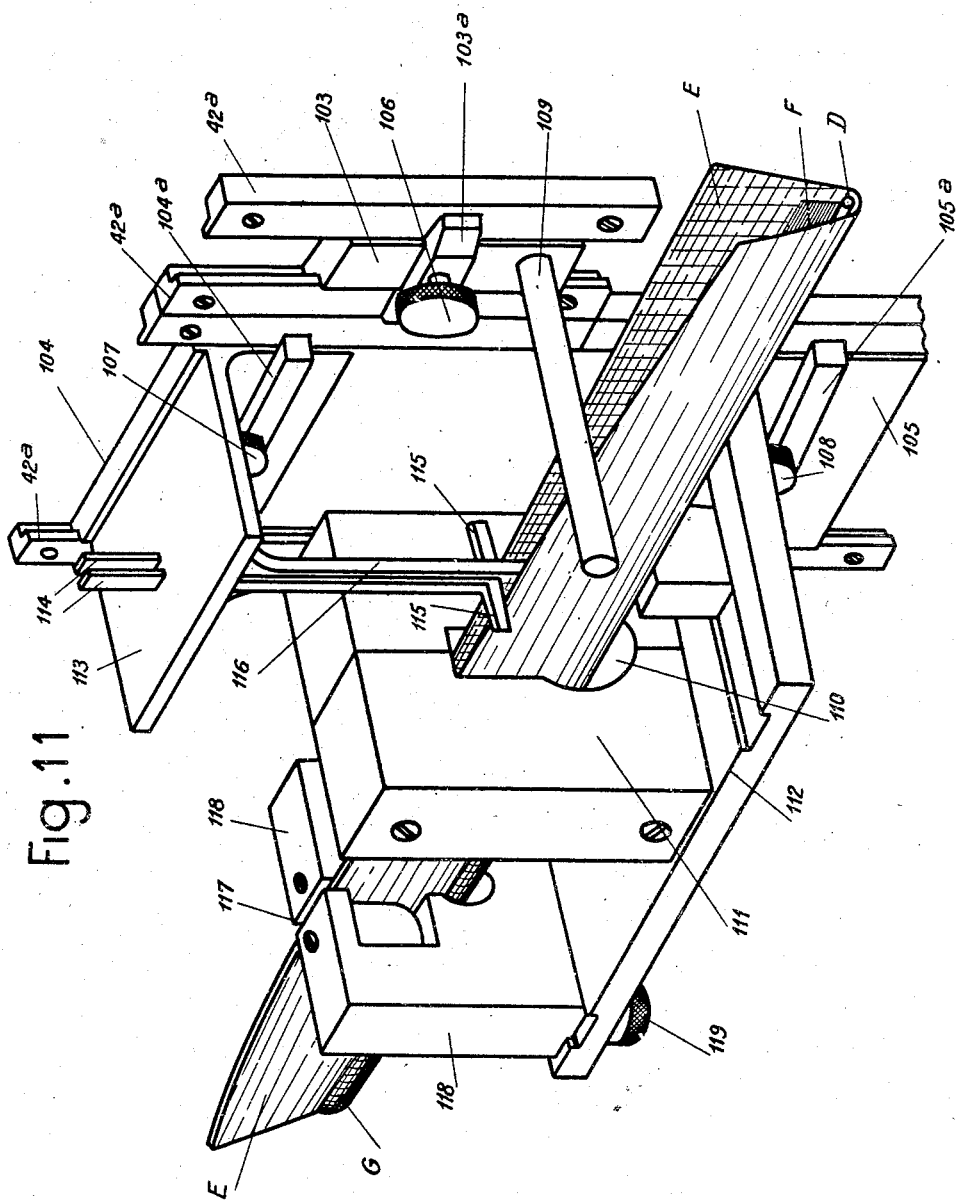

Patented Jan. 21, 1936

2,028,494

UNITED STATES PATENT OFFICE 2,028,494

MACHINE FOR MAKING FINISHING WELTS

Paul Blanchet and Gaston Tillie, Paris, France, assignors to Société Anonyme: F. A. C. A., Neuilly, France, a French limited company Application December 14, 1934, Serial No. 757,577
In France December 21, 1933

10 Claims. (Cl. 154—1)

This invention has reference to the manufacture of finishing welts or flexible beadings or moldings capable of being used for miscellaneous purposes, for instance for covering, concealing or filling joints or interstices in automobile body construction, in the manufacture of furniture, for upholstery purposes or for similar applications.

The primary object of the invention is to provide a machine capable of manufacturing this kind of finishing welt or flexible beading or molding in a completely automatic and continuous way from elements in the form of strips, tapes or ribbons.

A further object of the invention is to provide a machine as above set forth wherein the elements in the form of strips, tapes or ribbons adapted to build up the welt are automatically dragged, cemented or glued, shaped, brought together and juxtaposed to the required conformation by a sequence of devices, working independently from one another but all fed and actuated from common sources of material and energy.

A still further object of the invention is to provide a machine as above set forth wherein the devices for gradually producing the welt are removable and interchangeable so that a varying number of such devices may be used on the machine and the substitution of devices having strip-engaging means of a certain shape for other devices having strip-engaging means of another shape or profile makes it possible to alter the conformation imparted to the strips, tapes or ribbons and consequently the structure of the finished welts or moldings.

Still a further object of the invention is to provide a machine as above set forth of entirely automatic operation wherein the devices for gradually producing the welt or flexible beading or molding from strip-like elements are driven from a common prime mover located inside the chest-like frame of the machine, said devices being removably carried by the outer faces of said frame, which renders the machine compact and self-contained.

Still another object of the invention is to provide a machine as above set forth wherein the devices the sequential action of which produces the welt are so supported by the machine frame as to remain constantly visible and accessible, which permits the operator in charge of such a machine to constantly watch over their operation and to stop the machine at once if somehow any shaping phase is wrongly performed or if the strip material feeding sources, which may be for instance in the form of spools carried by the machine frame, become exhausted and require refilling.

Another object still of the invention is to provide a machine as above set forth, the parts of which are easy and cheap to make and assemble, the structure as a whole being simple, rugged and durable.

With these and such other objects in view as will incidentally appear hereafter, the invention comprises the arrangement and combination of parts constituting the aforesaid machine, as will now be described in detail with reference to the accompanying diagrammatic drawings exemplifying the invention and forming a part of the present disclosure.

In the drawings:

Figure 1 is a cross sectional view of a flexible joint-covering beading or welt of a known type made up of three juxtaposed strip elements and capable of being made continuously and automatically by means of the improved machine.

Figures 2 and 2a are two fragmentary elevational views showing one of the longitudinal faces of the machine, Figure 2 illustrating the heating and drying chamber while Figure 2a illustrates the several dragging, cement-applying, juxtaposing shaping or like devices which cooperate to gradually build up the welt shown in Figure 1.

Figure 4 is a view of another known type of welt applicable for instance between the fender and body of an automobile, this welt being made up of an outer strip of pliant material crimped or folded upon itself and encompassing adjacent its fold a rope or cord and, intermediate said strip and cord, a non-lacerable strip made up of warp threads or strands cemented to one another by rubber latex or like adhesive.

Figures 5 and 5a are two fragmentary elevational views showing the longitudinal face of the machine opposite to the one shown in Figures 2 and 2a, Figure 5 showing the several cement-applying, dragging, juxtaposing, shaping or like devices which sequentially co-operate to gradually produce the welt shown in Figure 4 while Figure 5a shows the heating and drying chamber.

Figure 6:
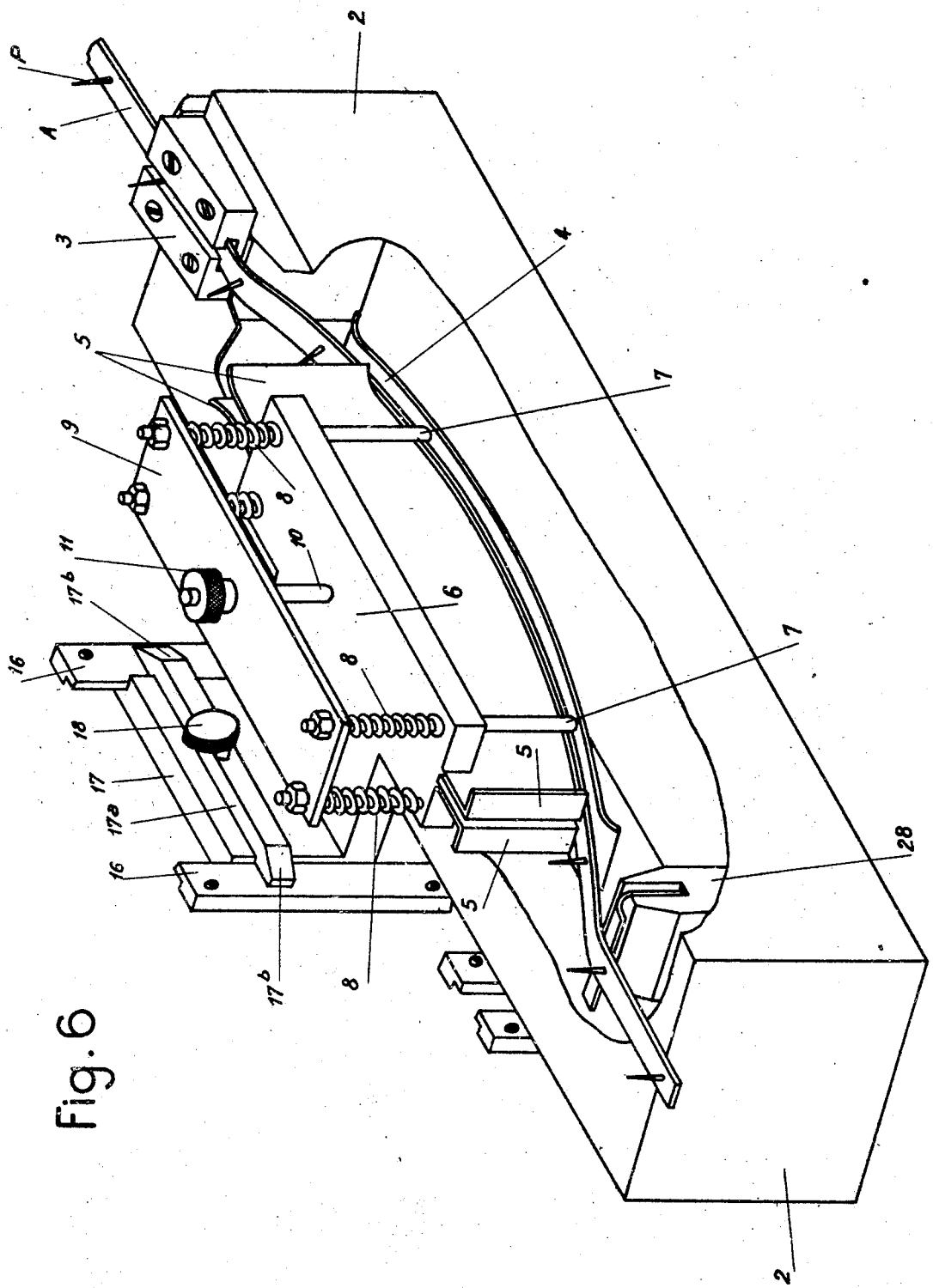

Figure 6 is a fragmentary view, partly broken away, showing the device adapted to apply cement or glue to the flexible core strip fitted with tacks at suitable intervals, which is incorporated to the welt made as shown in Figure 2.

Figure 7 is a fragmentary view showing the device adapted to shape the covering strip element of the finishing welt shown in Figure 1 and to apply the same to three of the side faces of the tack-carrying core strip element.

Figure 8 is a fragmentary view showing the device adapted to juxtapose to the partly finished welt, as produced by the device shown in Figure 7, a further strip element which must constitute the covering or wrapping of the welt.

Figure 9 is a fragmentary view showing the device adapted to bring together the three strip elements of which the flexible beading or welt shown in Figure 4 is made up.

Figure 10 is a fragmentary view showing the device for pre-shaping the two strip elements which are comprised in the welt shown in Figure 4.

Figure 11 is a fragmentary view showing the device adapted to definitely bring together said two strip-like elements and the cord comprised in said welt.

Figure 12 is a fragmentary perspective view showing the device for finishing the welt shown in Figure 4.

Figure 3:
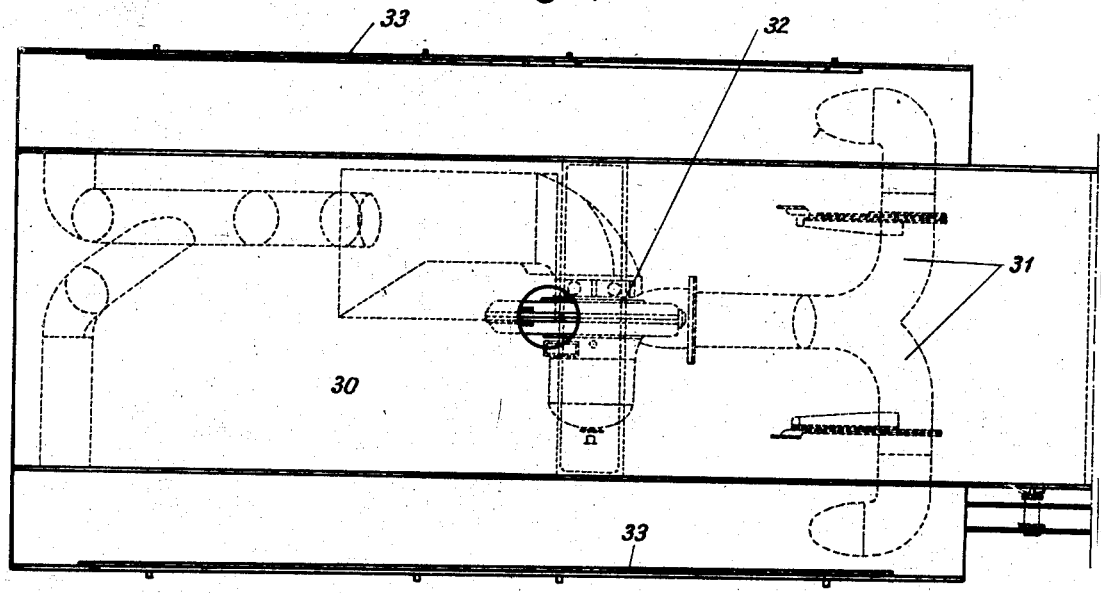
Figures 3 and 3a are top plan views corresponding to Figures 2 and 2a respectively.
Figure 3A:
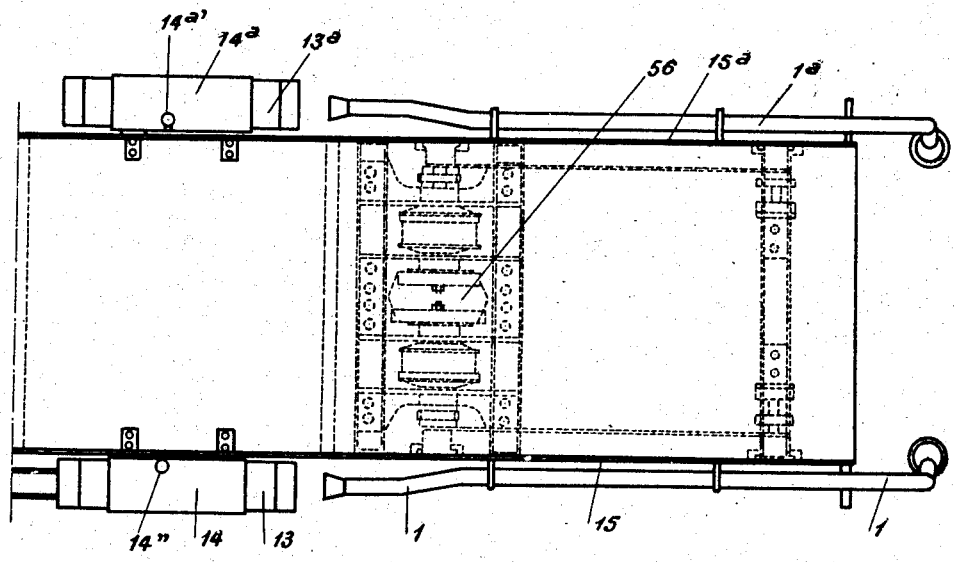

Like reference numerals designate like parts throughout the several views. Figures 2, 3 and 5 are general figures which are drawn to a smaller scale than Figures 6 to 12 inclusive, the latter being intended to give a clearer illustration of the constructional details of the several devices comprised in the machine for automatically making the finishing welts.

As above set forth, this machine is specially utilizable for continuously and automatically making joint-covering welts or flexible beadings such as those shown in Figures 1 and 4, with a minimum of labor. However the machine may be used for making other kinds of finishing welts, also supple fillers for rigid moldings.

The joint-covering welt or flexible beading shown in Figure 1 is made up of a core strip A carrying tacks P at suitable intervals, a core-covering strip B bent over the edges of said core strip A and cemented thereto, and a pliant facing strip C (made of natural leather or artificial leather for instance) cemented to said covering strip. The cement used for binding the three strips together may be rubber latex or the like.

As shown in Figure 2, the core strip A through which the tacks P have been previously set (in another machine which forms no part of the present invention and does not require therefore to be described or represented) is fed, tacks pointing upwards, by a guiding tube 1 to a cement-applying device comprising a trough 2 filled with a suitable cement, for instance rubber latex as aforesaid. The function of this device is to lay the cement on the surface of the core strip A except over about one third of that face from which the tacks P project.

To that effect (see Figure 6) the core strip A is guided through a slotted block 3 screwed to the top of the trough 2 and travels on a curved sole 4 along which it is held by spaced upstanding plates 5 carried by a table 6 through which columns 7 are engaged, springs 8 being coiled around said columns and abutted between the table 6 and a cross head 9 through which a threaded spindle 10 is engaged. A knurled nut 11 may be screwed up or down on the spindle 10 to permit adjustment of the pressure exerted by the springs 8 on the table 6 and consequently by the plates 5 on the core strip A while it travels along the curved sole 4. The upper level of the liquid cement (not shown) contained in the trough 2 must be such as to prevent said cement from entering the space between the plates 5 so that the middle portion of said strip A on both sides of the tacks P should remain devoid of cement. The constancy of the level of the cement in the trough 2 is ensured by an overflow device, as described hereafter.

The trough 2, which is adapted to furnish the cement or glue to the core strip element A, receives the cement through a pipe 12 (see Fig. 2) which extends downwardly from an overhead supply reservoir 13 having a removable cover 14. The reservoir 13 is supported at the upper end of one of the main upright plates 15 of the machine frame. The trough 2 is removably carried on guiding L-shaped rail sections 16, 16 (see Figure 6) through the medium of a cross slide 17, said rail sections being secured in any approved way, for instance by grub screws, to the outer face of the upright frame plate 15. A bolt having a knurled head 18 has its stem in engagement with the cross slide 17; the stem of this bolt passes through a transverse clamping bar 17a the ends 17b of which bear against the rail sections 16, 16. By screwing up the bolt head 18, the cross slide 17 is drawn outwardly by the bolt stem and the ends of said slide are pressed against the countersunk faces of the rail sections 16, 16 while the cross bar 17a is pressed simultaneously against the adjacent (outer) face of said cross slide 17. The clamping of the trough 2 is thus performed.

Adjustment of the position of the cross slide 17 and trough 2 heightwise is thus rendered possible by loosening the bolt 18 when required and tightening it again after having shifted the cross slide 17 up or down the rail sections 16, 16. A pair of bolts 19 (see Fig. 2) mounted in a way substantially similar to the bolts 18 engage cross slides spanning the rail sections 16, 16 and forming resting surfaces for the bottom of the trough 2 so as to assist in holding it up.

Through the cover 14 of the reservoir 13 is screwed a threaded rod 14' fitted at its upper end with a knob 14" and at its lower end with a tapering valve 14''' which can bear on a tapering seat 12' formed in the nipple uniting the top of the pipe 12 to the bottom of the reservoir 13 (see Fig. 2).

Adjustment of the rod 14' by means of the knob 14" permits to regulate the flow of the liquid cement from the reservoir 13 to the pipe by varying the distance of the valve 14''' and seat 12'.

The overflow of liquid cement from the uppermost trough 2 flows through any one of the depending pipes 20 which may project to the required height into said trough and which lead to another trough 21 connected by depending pipes 22 to a third trough 23 which in turn is connected by depending pipes 24 to a bin 25 receiving the surplus cement. The troughs 21 and 23 are removably carried by rail sections 26 secured to the frame upright plate 15 and held by bolts such as 27 as aforesaid. The several troughs and interconnecting pipes can thus be removed bodily from the machine frame after having loosened the trough-holding slides and bolts, as above set forth, for instance for cleaning said troughs or for adjusting them to other positions.

When coming out of the cement-applying trough 2, the core strip A provided with tacks P and now having cement on a portion of its peripheral face passes over a doctor block 28 (see Fig. 6) by which any excess of cement is wiped off. The core strip A then passes through a tubular channel 29 (see Fig. 2) to the heating and drying chamber 30 provided inside the machine frame which forms an elongated chest. The atmosphere of the heating and drying chamber 30 is kept at any suitable temperature by any heating plant, for instance by a piping 31 connected to the outlet of a fan 32 the inlet of which is connected to an air heater located outside the machine. This air heater forms no part of the invention and is not therefore illustrated. It may also in certain cases be located inside the machine, for instance in the form of a gas burner.

Wide shutters 33 carried by hinges 34 may be rocked up or down to permit an easy access to the interior of the heating chamber 30. Inside the latter are rotatably mounted flanged pulleys 35, 36 on which the core strip A having tacks P projecting outwardly is guided twice to be subjected to a drying operation due to the temperature of the surrounding atmosphere. After passing on the pulley 35, tacks P pointing upwards, the core strip A passes around the pulley 36, then travels back towards the pulley 35, tacks P pointing downwards, and back again towards the pulley 36, tacks P pointing upwards. When leaving the pulley 35, for the second time, the core strip A is desiccated and its tacks P point downwards. During its travel to a jockey roller 37 carried by a bracket 38 secured to the frame upright plate 15, the core strip A is twisted upon itself at T (without extraneous means) so as to cause its tacks P to point upwards as it reaches the jockey roller 37. Such twisting of the core strip A is initiated by the worker when starting the machine into operation and when engaging said core strip A on the jockey roller 37 for the first time. The twisting of the core strip A is afterwards preserved automatically.

While the core strip A travels along the above described circuit, another strip, tape or ribbon B which, in the finished welt, will form the core covering or intermediate element of said welt travels along a different circuit which will now be described. The circuit of the strip B is similarly adapted to permit liquid cement or glue to be applied on it and then to become partly dried, whereafter the strip B must be juxtaposed to the core strip A. The strip B is fed from a stock spool 39 revolubly carried by the frame upright plate 15 and passes through the cement-containing trough 23 to receive therein a film of cement. After leaving the trough 23, the strip B enters the heating and drying chamber 30 and is guided over flanged pulleys 40, 41. The pulley 41 is located adjacent the pulley 36 over which the core strip A is guided so that when they both leave the drying chamber 30, both strips A and B can be guided easily through the bracket 38 on their way to a dragging and assembling device which will now be described in detail with reference to Figure 7.

The device for dragging and assembling the strips A and B to form a partly finished welt is supported removably against the frame upright plate 15 of the machine by a pair of spaced guiding L-shaped rail sections 42, 42 bridged by a cross slide 43 which carries a bracket 45 to which are suspended certain of the operative parts of the device. A bolt having a knurled head 44 has its stem in engagement with the cross slide 43; the stem of this bolt passes through a transverse clamping bar 43a the ends 43b of which bear against the rail sections 42, 42. The co-operation of the parts 43, 43a, 44 is similar to the co-operation of the parts 17, 17a, 18 as above-described.

Thus the position of the cross slide 43 is adjustable along the rail sections 42, 42.

A pair of upright plates 46 (Fig. 7) are slightly spaced to provide a gap through which the tacks P set in the core strip A can freely pass as said strip is fed through the assembling device. A further cross slide 47 spanning the rail sections 42, 42 is adjustable as above-described by means of a bolt having a knurled head 48 whose stem passes through a clamping bar 47a. The cross slide 47 carries a bracket 49 which is provided on its upper face with two rows of vertical rollers 50 revolubly supported on pins set in girders 50a having tenons 50b fitted adjustably in mortises 50c formed in the upper face of the bracket 49, whereby said girders may be moved towards or away from each other and the distance between the rollers 50 can be adjusted to suit the width of the strip B. The latter is guided between the two rows of vertical rollers 50 by having its edges in frictional engagement with said rollers. The upright plates 46 and rollers 50 co-operate to properly locate the strips A and B relative to each other.

Just as they leave the plates 46 and rollers 50, the strips A and B which are now juxtaposed pass between a pair of assembling wheels 51, 52 carried by horizontal axes supported by an upstanding plate 53 secured to the frame upright plate 15. The upper wheel 51 has a narrow groove 54 through which the tacks P of the core strip A can pass freely. The lower wheel 52 has a wide groove of such a cross sectional curved outline as to properly shape the strip B by bending its marginal portions over the edges of the core strip A. To that effect, the width of the rim of the upper wheel 51 is such as to permit said wheel to engage the groove in the lower wheel 52 so that the two rims of said wheels may co-operate to perform the assembling operation. The wheels 51 and 52 are removably held on their horizontal axes by nuts 51a and 52a so that they may be taken off when required. This permits to substitute other wheels having rims of different size and shape in order to shape other strips, when a welt somewhat different in size from the one shown in Figure 1 has to be produced.

The shaping and assembling wheels 51, 52 may be driven in any approved way, for instance by a bevel gear actuated from a prime mover such as the electric motor 56 located in the machine frame. This drive is not illustrated as it may be of a conventional nature that anyone skilled in the art will understand and which forms no part of the invention. A castellated wheel 55 is provided for vertically adjusting the position of the shaping wheel 51 with respect to the companion shaping wheel 52. The wheel 55 may be mounted for instance on a shaft actuating a worm wheel located inside the machine frame, the worm associated with said worm wheel engaging a bearing block carrying the stud of the shaping wheel 51, said stud passing through an elongated opening of the upright frame plate 15. Said stud carries a cog wheel meshing with another cog wheel carried by the stud of the lower shaping wheel 52. In view of this construction, rotation of the castellated wheel 55 in the one or the other direction acts, through the worm gear, to slightly move the meshing cog wheels toward or away from each other, for instance to the extent of one twenty-fifth of an inch and thus adjusts the distance between the rims of the shaping wheels 51, 52. This adjusting device can be easily understood from this explanation without requiring an illustration.

When coming out of the first assembling device which has just been described, the partly finished welt A—B passes through a supporting yoke 57 secured to the upright frame plate 15 of the machine. On a roller 58 carried by the yoke 57 is guided a strip C adapted to constitute the facing of the finished welt. The strip C is fed by a stock spool 59 revolubly supported by the upright frame plate 15; it passes over a tensioning roller 60, passes through the cement-applying trough 21 and travels through the heating and drying chamber 30 over a pulley 61.

After having passed through the yoke 57, the strips A, B and C of the welt in the course of fabrication reach a second assembling device which is shown in detail in Figure 8. This device is removably supported against the upright frame plate 15 by a pair of rail sections 62, 62 by means of a cross slide 63 carrying a bracket 67. A bolt having a knurled head 64 has its stem in engagement with a clamping bar 63a the ends 63b of which bear on the outer faces of the rail sections 62, 62. Adjustment is effected as above described. A channel member 66 is carried by the cross slide 63 and gives passage to the strips A, B, C while correctly positioning them with respect to one another due to its shape, as shown. From the bracket 67 depend a pair of cheek plates 68, 68 between which the tacks P set in the core strip A can freely pass. When coming out of this shaping device, the strips A, B, C are finally assembled by passing through a block 69 having a groove 70 through which the tacks P can pass freely. Immediately beyond the block 69 are positioned a pair of superimposed shaping wheels 71, 72 supported by a plate 73 carried by the upright frame plate 15. The operation and adjustment of the shaping wheels 71, 72 are similar to those of the shaping wheels 51, 52 described with reference to Figure 7 and need not be further described. The upper shaping wheel 71 has a groove 74 through which the tacks P can pass freely. A castellated wheel 75 permits the position of the upper shaping wheel 71 to be adjusted at will, as above described.

When coming out of the shaping wheels 71, 72, as shown by the arrow f, the finished welt is ready made and has the structure shown in cross section in Figure 1. Such a welt can be used without further manipulation. It can be wound on a stocking pulley or drum (not shown) or otherwise stocked.

As above described, the improved machine is also utilizable for making other kinds of welt than the one shown in Figure 1. Thus the machine is suitable for making a welt as shown in Figure 4. Such a welt is specially utilizable on automobiles for being inserted or wedged between the body and the fenders and it comprises a cord D housed in a fold G of a wrapping strip E, a non-lacerable strip formed by a lap or layer of longitudinal agglutinated threads or strands F being interposed between the cord D and the inner face of the wrapping strip E for preventing the welt when finished to become torn off right through. The threads or strands F may be agglutinated together by any suitable adhesive such for instance as a solution of rubber latex.

The operative devices comprised in the machine which are suitable for making a welt as shown in Figure 4 can be mounted on its upright frame plate 15a located on the side opposite to the one occupied by the plate 15. This arrangement permits a welt such as the one shown in Figure 1 to be continuously manufactured on the one side of the machine while a welt such as the one shown in Figure 4 is continuously manufactured on the opposite side. The devices carried to that effect by the upright plate 15a will now be described in detail with reference to Figure 5.

These devices comprise a plurality of dragging, cement-applying, shaping and assembling devices adapted to shape the strip E and to position the cord D and strip F of which the welt is to be made. Said devices are so constructed as to lend themselves to mounting either on the plate 15 or on the plate 15a of the machine frame. Thus shaping devices adapted to make a welt as shown in Figure 1 may be mounted both on the frame plate 15 and on the frame plate 15a to permit a larger output of such welt. Conversely, shaping devices adapted to make a welt as shown in Figure 4 may be mounted on both frame plates 15 and 15a to permit a larger output of said welt. Said shaping devices may also be used with slight appropriations for continuously and automatically making other kinds of welts also made up of a plurality of strips or bands assembled and cemented together.

Standard supporting and guiding means as above described are provided on both upright frame plates of the machine frame for permitting the shaping and assembling devices to be mounted on them removably and interchangeably. By this arrangement, the machine lends itself to the manufacture of miscellaneous finishing welts or flexible beadings.

As shown by Figure 5, the parallel threads or strands adapted to constitute the non-lacerable strip F of the welt are guided between the teeth of a comb 80 secured to the upright frame plate 15a of the machine. When coming out of the comb 80, such threads or strands reach a cement-containing trough 2a fed by a tube 12a depending from a cement reservoir 13a provided with a removable cover 14a. This reservoir 13a is constructed as the reservoir 13 and it comprises similarly a valve operated through a rod (not shown) by a knob 14a". This construction does not require to be again described here.

Before entering the trough 2a, the threads F pass over a guide 81. When leaving said trough, the threads pass under a small doctor blade 82 which wipes off any excess of liquid cement and only leaves on said threads a thin film of cement (for instance a solution of rubber latex) whereafter the lap of threads enters the heating and drying chamber 30. This chamber is closed on the side of the machine shown in Figure 5a by pivotable shutters 33a carried by hinges 34a. The threads or strands F coated with cement pass over a guiding pulley 83 revolubly mounted in the drying chamber and then through a pre-shaping device 84 located adjacent said chamber.

The pre-shaping device 84 is shown in detail in Figure 9. It comprises a bracket 85 having a slot 86 through which the lap of threads F passes. The bracket 85 is carried by a cross slide 87 received between L-shaped rail sections 89 secured to the upright frame plate 15a of the machine. A bolt having a knurled head 88 has its stem engaged with the cross slide 87 and through a clamping bar 87a the ends 87b of which bear against the rail sections 89. Loosening and tightening up of the bolt 88 permits to adjust the position of the cross slide 87 along the rail sections 89, 89 in order to vary the height of the device 84 above the ground. The lower portion of the slot 86 must be so shaped as to permit passage of the cord D which may be fed from any convenient source, for instance from a stock spool (not shown). The cord D is guided on its way to the lower portion of the slot 86 by a grooved roller 90 carried by the bracket 85 and by a grooved slideway 91. The lower part of the bracket 85 is formed moreover with a transverse slot 92 through which passes the strip E which, as above described, will form the wrapping of the welt when finished.

The strip E is fed from a spool 39a revolubly mounted on the upright frame plate 15a of the machine. Said strip passes through a cement-applying trough 23a between a pair of rollers 93, 94. The quantity of liquid cement in said trough must be such that only the lower face of said strip is rendered adhesive for properly building the welt. This result is attained by engaging the pipes 24a, 24a into the trough 23a to the required height so that they may act as overflow pipes. After being thus coated with liquid cement, the strip E enters the heating and drying chamber 30 in which it is guided over pulleys 95, 96. When coming out of said chamber, the strip E reaches the pre-shaping device shown in Figure 9 and above-described.

Beyond the pre-shaping device shown in Figure 9, the three elements of which the welt will be formed already occupy correct positions relative to one another. Said elements (cord D, strip E and lap of threads F) then reach a shaping device as shown in Figure 10. This device comprises a bracket 97 carried by a cross slide 98 received between L-shaped vertical rail sections 100, 100 secured to the upright frame plate 15a of the machine. A clamping bar 98a is engaged by the stem of a bolt having a knurled head 99, said stem being screwed into the cross slide 98, whereby adjustment of the bolt 99 permits the cross slide 98 to be loosened or clamped at will and the bracket 97 to be adjusted to the desired height. The bracket 97 has a lower arcuate opening 101 provided with a pair of upwardly extending notches 102, 102 which are adapted to bend up the strip E.

When coming out of the shaping device shown in Figure 10, the elements D and F of the welt in the course of fabrication occupy their correct positions relative to each other and are accommodated in a channel formed by the bent strip E. The elements thus relatively positioned then reach a further shaping device shown in Figure 11.

The shaping device shown in Figure 11 is supported from vertical rail sections 42a secured to the upright frame plate 15a by means of cross slides 103, 104, 105, clamping bars 103a, 104a, 105a and bolts having knurled heads 106, 107, 108. Adjustment heightwise is accomplished as above described with reference to Figure 6. The cross slide 103 carries a yoke rod 109 under which the partly made welt D—E—F is caused to pass and be held down before reaching an opening 110 formed in a bracket 111 supported by a bracket 112 carried by the cross slide 105. The cross slide 104 carries a bracket 113 through which are adjustably secured a pair of hanging stems 114, 114 fitted at their lower ends with yoke rods 115, 115 adapted to hold down the upper edges of the crimped strip E. By adjusting the position of the stems 114, 114 heightwise, the respective positions of the yoke rods 115, 115 can also be adjusted for making a welt of the type shown in Figure 4 but wherein the wings of the wrapping strip E will be of unequal size. A further hanging stem 116 secured to the bracket 113 engages between the plies of the crimped strip E and holds down the cord D and the lap of agglutinated threads F as the welt passes through this shaping device. When going out of the apertured bracket 111, the partly made welt passes through a slot 117 formed in a further bracket 118 and adapted to guide it. Both sides of the slot 117 are formed by jaws the mutual distance of which may be adjusted by means of a nut 119, through a worm gear of conventional shape (not visible in Figure 11) and forming no part of the invention.

Finally, the partly finished welt D—E—F passes through a third shaping device shown in detail in Figure 12. The purpose of this shaping device is to give to the welt its definitive shape by still more closely bringing together its three elements which were previously caused to adhere as above stated. The device shown in Figure 12 comprises a bracket 120 carried by a cross slide 121 spanning a pair of upstanding rail sections 62a, 62a secured to the upright frame plate 15a of the machine. A bolt having a knurled head 122 has its stem in engagement with said cross slide 121 and with a clamping bar 121a having its ends bearing against the rail sections 62a, 62a. On the bracket 120 is carried a platen 123 having notches 124 through either the one or the other of which engages the upstanding shank of a clamping bolt 125. The platen 123 carries rollers 126 which press the bead G of the welt which lies on its side as it passes through this shaping device. The position of the platen 123 can be adjusted by loosening the bolt 125 and can be held invariable by tightening said bolt, which permits to vary the position where the pressing rollers 126 engage the welt bead G to suit the width of said welt. When leaving the platen 123, the welt thus pressed together passes between a pair of pressing rollers 127, 128 having their axes journalled through the plate 73a secured to the upright frame plate 15a of the machine.

When leaving the pressing rollers 127, 128, the welt or flexible beading is ready for use. Depending on whichever side of the machine to have been used, the welt thus produced is built as shown by Figure 1 or as shown by Figure 4. However, as above described, the manufacturing capacity of the machine is not limited to these two kinds of welt. Many similar welts similarly made up of juxtaposed and assembled strips or bands may be produced in the machine.

It will be seen from the foregoing that the invention provides a machine requiring a minimum of labor and capable of automatically and continuously manufacturing different types of finishing welts. All the sequentially co-operating dragging, cement applying, juxtaposing and shaping means as above described are easily removable from the rail sections or similar supports which carry them and adjustable along said supports. This permits to readily adjust the relative positions of said means and consequently to vary the respective paths followed by the strip elements of which is to be made any welt in the course of fabrication. By varying said paths, the strip elements may be diversely brought together and juxtaposed. In other words, adjustment of said co-operating means makes it possible to easily appropriate the machine to the fabrication of many kinds of welt.

The constructional details of the machine may vary of course without departing from the scope of the subjoined claims.

What is claimed is:

1. A machine for automatically and continuously making welts of the type formed of juxtaposed elements such as strips and cords, comprising an upstanding frame, dragging means on said frame for pulling each welt element from a separate feed, guiding means on said frame for causing the welt elements to travel along separate paths, cement applicators mounted on said frame and traversable by selected elements on their way from their feeds to the dragging means, a drying chamber located in the paths of the selected elements between the feeds and the dragging means, and means on the frame for juxtaposing and shaping the welt elements intermediate the drying chamber and dragging means.

2. A machine for automatically and continuously making welts of the type formed of juxtaposed elements such as strips and cords, comprising an upstanding frame, dragging means on said frame for pulling each welt element from a separate feed, guiding means on said frame for causing the welt elements to travel along separate paths, cement applicators mounted on said frame and traversable by selected welt elements from their feeds to the dragging means, said applicators consisting of vertically aligned troughs fed by a pipe controlled by a valve from an overhead reservoir and connected by overflow pipes mutually and to a bottom cement-receiving bin, a hot drying chamber located in the paths of the selected welt elements between the cement applicators and the dragging means, and means on said frame for juxtaposing and shaping the welt elements intermediate the drying chamber and dragging means.

3. A machine for automatically and continuously making welts of the type formed of juxtaposed elements such as strips and cords, comprising an upstanding frame, dragging means on said frame for pulling each welt element from a separate feed, guiding means on said frame for causing the welt elements to travel along separate paths, cement applicators mounted on said frame and traversable by certain of said welt elements on their way from their feeds to the dragging means, a hot drying chamber arranged in a portion of the machine frame and located in the paths of the last-named elements between the cement applicators and the dragging means, and means on the frame for juxtaposing and shaping sequentially the welt elements intermediate the drying chamber and dragging means.

4. A machine for automatically and continuously making welts of the type formed of juxtaposed elements such as strips and cords, comprising a frame having upright plates, a series of supports secured to said plates, dragging means removably carried by some supports and pulling each welt element from a separate feed, guiding means removably carried by other supports for causing the welt elements to travel along separate paths, cement applicators carried by other supports and traversable by selected welt elements on their way from their feeds to the dragging means, a hot drying chamber located in the paths of the selected welt elements between the feeds and the dragging means, and means carried by still other of said supports for juxtaposing and shaping the welt elements intermediate the drying chamber and dragging means.

5. A machine for automatically and continuously making welts of the type formed of juxtaposed elements such as strips and cords, comprising a frame having upright plates, a series of spaced upstanding L-shaped rail sections fixed to said plates, dragging means for pulling each welt element from a separate feed, guiding means for causing the welt elements to travel along separate paths, vertically aligned cement applicators traversable by selected welt elements on their way from their feeds to the drying means, a hot drying chamber located in the paths of the selected welt elements between the feeds and the dragging means, and means for juxtaposing and shaping the welt elements intermediate the drying chamber and dragging means, each of said means comprising a cross slide fitted between a pair of adjacent rail sections, a transverse clamping bar spanning said sections and bearing on their outer faces and a bolt the stem of which engages through the clamping bar and into the cross slide.

6. A machine for automatically and continuously making welts of the type formed of juxtaposed elements such as strips and cords, comprising an upstanding frame, pairs of tangential dragging rollers on said frame for pulling between them each welt element from a separate feed, guiding means on said frame for causing the welt elements to travel along separate paths, cement applicators mounted on said frame and traversable by selected elements on their way from their feeds to the dragging rollers, a hot drying chamber located in the paths of the selected welt elements between the feeds and the dragging rollers, and means on the frame for juxtaposing and shaping the welt elements intermediate the drying chamber and rollers.

7. A machine for automatically and continuously making welts of the type formed of juxtaposed elements such as strips and cords, comprising an upstanding frame, dragging means on said frame for pulling each welt element from a separate feed, a sequence of upstanding plates and rollers carried at spaced positions by said frame and engaging the respective welt elements for causing them to travel along separate paths, cement applicators mounted on said frame and traversable by selected welt elements on their way from their feeds to the dragging means, a hot drying chamber located in the paths of the selected welt elements between the feeds and the dragging means, and means on the frame for juxtaposing and shaping the welt elements intermediate the drying chamber and dragging means.

8. A machine for automatically and continuously making welts of the type formed of juxtaposed elements such as strips and cords, comprising an upstanding frame, dragging means on said frame for pulling each welt element from a separate feed, element-feeding spools revolubly carried by the frame, guiding means on said frame for causing the welt elements to travel along separate paths, vertically aligned cement applicators mounted on said frame and traversable by selected welt elements on their way from the spools to the dragging means, a drying chamber arranged in a portion of the frame, a heat feeder in said chamber, pulleys in said chamber for causing the selected welt elements to pass through the drying chamber on their way from said applicators to the dragging means, and means on the farme for gradually juxtaposing and shaping the welt elements intermediate the drying chamber and dragging means.

9. A machine for automatically and continuously making welts of the type formed of juxtaposed elements such as strips and cords, comprising a frame having a pair of parallel upright plates, a series of spaced pairs of supports on said plates, dragging rollers removably carried by said supports for pulling each welt element from a separate spool, guiding plates and rollers removably carried by some of the supports for causing the welt elements to travel along separate paths, cement applying troughs removably carried by some of said supports and traversable by selected welt elements on their way from the spools to the dragging rollers, doctors for wiping off excess of cement from the cement-coated welt elements, the troughs being vertically aligned on each frame upright plate and being fed by a descending pipe controlled by a valve from an overhead reservoir, overflow pipes connecting the troughs mutually and to a bottom cement-receiving bin, a hot drying chamber located in the paths of the cement-coated welt elements on their way from the troughs to the dragging rollers, and apertured brackets removably carried by some of said supports and juxtaposing and shaping the welt elements gradually intermediate the drying chamber and dragging rollers.

10. A machine for automatically and continuously making welts of the type formed of juxtaposed and cemented elongated elements such as strips and cords, comprising a frame having a pair of parallel upright plates spaced from each other, a series of spaced pairs of vertical supports on said upright plates, dragging rollers removably and adjustably carried by said supports for pulling each welt element from a separate feed, element-feeding spools revolubly carried by the upright frame plates, guiding plates and rollers removably carried by some of the supports for causing the welt elements to travel along separate paths, vertically aligned cement-applying troughs removably and adjustably carried by some of said supports and traversable respectively by selected welt elements on their way from the spools to the dragging rollers, doctors for wiping off the excess of cement from the welt elements as they leave the troughs, an overhead reservoir having a descending pipe feeding the top trough, overflow pipes connecting the troughs mutually and to a bottom cement-receiving bin, a drying chamber arranged in a portion of the frame between the upright plates, a heat feeder in said chamber, pulleys in said chamber for causing the cement-carrying welt elements to pass in zigzag through the drying chamber on their way from said troughs to the dragging rollers, and apertured brackets removably and adjustably carried by some of said vertical supports for juxtaposing and shaping the welt elements gradually intermediate the drying chamber and dragging rollers.

PAUL BLANCHET.
GASTON TILLIE.